(12) United States Patent
Chu et al.

(10) Patent No.: US 12,737,078 B2
(45) Date of Patent: Sep. 15, 2026

(54) SENSING CIRCUIT AND SENSING METHOD

(71) Applicant: AUO Corporation, Hsinchu City (TW)

(72) Inventors: Chia-Hsien Chu, Hsinchu City (TW); Chun-Chi Lai, Hsinchu City (TW); Ching-Sheng Cheng, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 19/056,082

(22) Filed: Feb. 18, 2025

(65) Prior Publication Data

US 2025/0190072 A1 Jun. 12, 2025

Related U.S. Application Data

(63) Continuation of application No. 17/938,984, filed on Sep. 7, 2022, now abandoned.

(30) Foreign Application Priority Data

Feb. 9, 2022 (TW) ................................. 111104706

(51) Int. Cl.
*G06F 3/041* (2006.01)
*G06F 3/044* (2006.01)

(52) U.S. Cl.
CPC ...... *G06F 3/041662* (2019.05); *G06F 3/0443* (2019.05); *G06F 3/0446* (2019.05); *G06F 3/0447* (2019.05)

(58) Field of Classification Search
CPC ............. G06F 3/041662; G06F 3/0443; G06F 3/0446; G06F 3/0447; G06F 3/04166; G06F 3/0418; G06F 3/0416; G06F 3/044
See application file for complete search history.

(56) References Cited

U.S. PATENT DOCUMENTS 9,182,865 B2 11/2015 Chae
9,569,035 B1 2/2017 Lee
(Continued)

FOREIGN PATENT DOCUMENTS

CN 105094490 A 11/2015
CN 106484191 A 3/2017
(Continued)

OTHER PUBLICATIONS

Machine translation of CN115113768 (Year: 2022).*
Machine translation of TWI1412983B (Year:2011).

*Primary Examiner* — Patrick N Edouard
*Assistant Examiner* — Joseph P Fox
(74) *Attorney, Agent, or Firm* — WPAT, PC

(57) ABSTRACT

The sensing circuit comprises a plurality of first transceiver capacitors and a plurality of second transceiver capacitors. The plurality of first transceiver capacitors are configured to send and receive a plurality of first detection signals. The plurality of second transceiver capacitors, configured to send and receive a plurality of second detection signals. During a self-capacitance mode, the plurality of first transceiver capacitors are configured to output the plurality of first detection signals and receive the plurality of first detection signals, and the plurality of second transceiver capacitors are configured to output the plurality of second detection signals and receive the plurality of second detection signals. During a mutual-capacitance mode, the plurality of first transceiver capacitors are configured to output the plurality of first detection signals, and the plurality of second transceiver capacitors are configured to receive the plurality of first detection signals.

19 Claims, 11 Drawing Sheets

(56) References Cited

U.S. PATENT DOCUMENTS 10,684,731 B2 6/2020 Wang et al.
2011/0175834 A1 7/2011 Han
2017/0147141 A1 5/2017 Khazeni
2018/0088706 A1 3/2018 Tanemura
2021/0026484 A1 1/2021 Kim
2022/0404932 A1* 12/2022 Gray ..................... G06F 3/0418

FOREIGN PATENT DOCUMENTS

CN 115113768 A * 9/2022 ........... G06F 3/0416
KR 20230020718 A 2/2023
TW I412983 B 10/2013

* cited by examiner

100A

Row

Column

Row

Column

SENSING CIRCUIT AND SENSING METHOD

CROSS-REFERENCE TO RELATED APPLICATION

This application is a continuation of U.S. application Ser. No. 17/938,984, filed Sep. 7, 2022, which claims priority to Taiwan Application Serial Number 111104706, filed Feb. 9, 2022, which is herein incorporated by reference in its entirety.

BACKGROUND

Field of Invention

The present invention relates to a sensing circuit. More particularly, the present invention relates to a sensing circuit applied to a touch panel.

Description of Related Art

The detection of the touch panel is related to the change of the capacitance value. When the touch panel is used for a period of time, the air gap between the touch detector and the panel will change, which will lead to changes in the capacitance value, making the system mistakenly think that a finger touch is detected. In addition, if the detection signal source has the noise, it will also make the system misjudgment.

SUMMARY

This summary is intended to provide a simplified abstract of the disclosure to provide the reader with a basic understanding of the present disclosure. This summary is not an exhaustive overview of the disclosure, and it is not intended to identify key/critical elements of the present embodiments or to delimit the scope of the present disclosure.

The present disclosure provides a sensing circuit. The sensing circuit comprises a plurality of first transceiver capacitors and a plurality of second transceiver capacitors. The plurality of first transceiver capacitors are configured to send and receive a plurality of first detection signals, and the plurality of first detection signals are independent of each other. The plurality of second transceiver capacitors, configured to send and receive a plurality of second detection signals, and the plurality of second detection signals are independent of each other. The plurality of first transceiver capacitors and the plurality of second transceiver capacitors are alternately arranged to form an array. During a self-capacitance mode, the plurality of first transceiver capacitors are configured to output the plurality of first detection signals and receive the plurality of first detection signals, and the plurality of second transceiver capacitors are configured to output the plurality of second detection signals and receive the plurality of second detection signals. During a mutual-capacitance mode, the plurality of first transceiver capacitors are configured to output the plurality of first detection signals, and the plurality of second transceiver capacitors are configured to receive the plurality of first detection signals. The plurality of first transceiver capacitors are not adjacent to each other on any row and any column of the array, and the plurality of first transceiver capacitors are adjacent to each other on any diagonal, any subdiagonal, and any superdiagonal of the array. The plurality of second transceiver capacitors are not adjacent to each other on the any line and the any column of the array, and the plurality of second transceiver capacitors are adjacent to each other on the any diagonal, the any subdiagonal, and the any superdiagonal of the array.

The present disclosure provides a sensing method. The sensing method comprises the following steps: sending and receiving a plurality of first detection signals by a plurality of first transceiver capacitors, and the plurality of first detection signals are independent of each other; sending and receiving a plurality of second detection signals by a plurality of second transceiver capacitors, and the plurality of second detection signals are independent of each other; during a self-capacitance mode, the plurality of first transceiver capacitors are configured to output the plurality of first detection signals and receive the plurality of first detection signals, and the plurality of second transceiver capacitors are configured to output the plurality of second detection signals and receive the plurality of second detection signals; and during a mutual-capacitance mode, the plurality of first transceiver capacitors are configured to output the plurality of first detection signals, and the plurality of second transceiver capacitors are configured to receive the plurality of first detection signals.

Therefore, according to the technical content of the present disclosure, the sensing circuit and sensing method shown in the embodiment of the present disclosure can discriminate between the finger and the noise, so as to achieve the effect of normal touch function.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 1 is a schematic diagram of a sensing circuit according to one embodiment of the present disclosure.

FIG. 2 is a schematic diagram of a sensing circuit according to one embodiment of the present disclosure.

Figure 3:
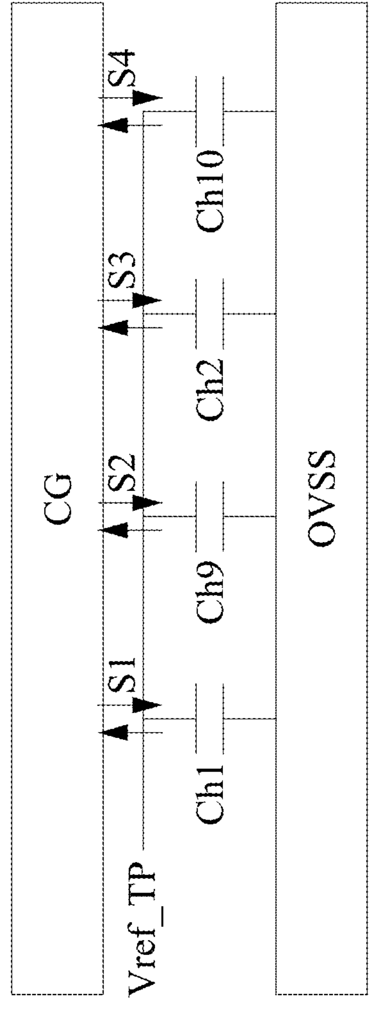
FIG. 3 is a schematic diagram of an operation situation of a sensing circuit according to one embodiment of the present disclosure.

In accordance with customary practice, the various features and elements in the drawings are not drawn to scale, but are drawn in a manner that best represents the specific features and elements relevant to the present disclosure. Furthermore, among the different drawings, similar elements/components are referred to by the same or similar reference numerals.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In order to make the description of the present disclosure more detailed and complete, the following provides an illustrative description for the implementation aspect and specific embodiments of the present case; but this is not the only form of implementing or using the specific embodiments of the present disclosure. The features of various specific embodiments as well as the method steps and sequences for constructing and operating these specific embodiments are encompassed in the detailed description. However, other specific embodiments may also be utilized to achieve the same or equivalent function and sequence of steps.

Unless otherwise defined in this specification, the scientific and technical terms used herein have the same meanings as understood and commonly used by those with ordinary knowledge in the technical field to which this case belongs. In addition, without conflicting with the context, the singular noun used in this specification covers the plural form of the noun; and the plural noun used also covers the singular form of the noun.

In addition, as used herein, "coupled" may mean that two or more elements are in direct physical or electrical contact with each other, or are in indirect physical or electrical contact with each other, and may also mean that two or more elements operate with each other or action.

Figures 1, 2:
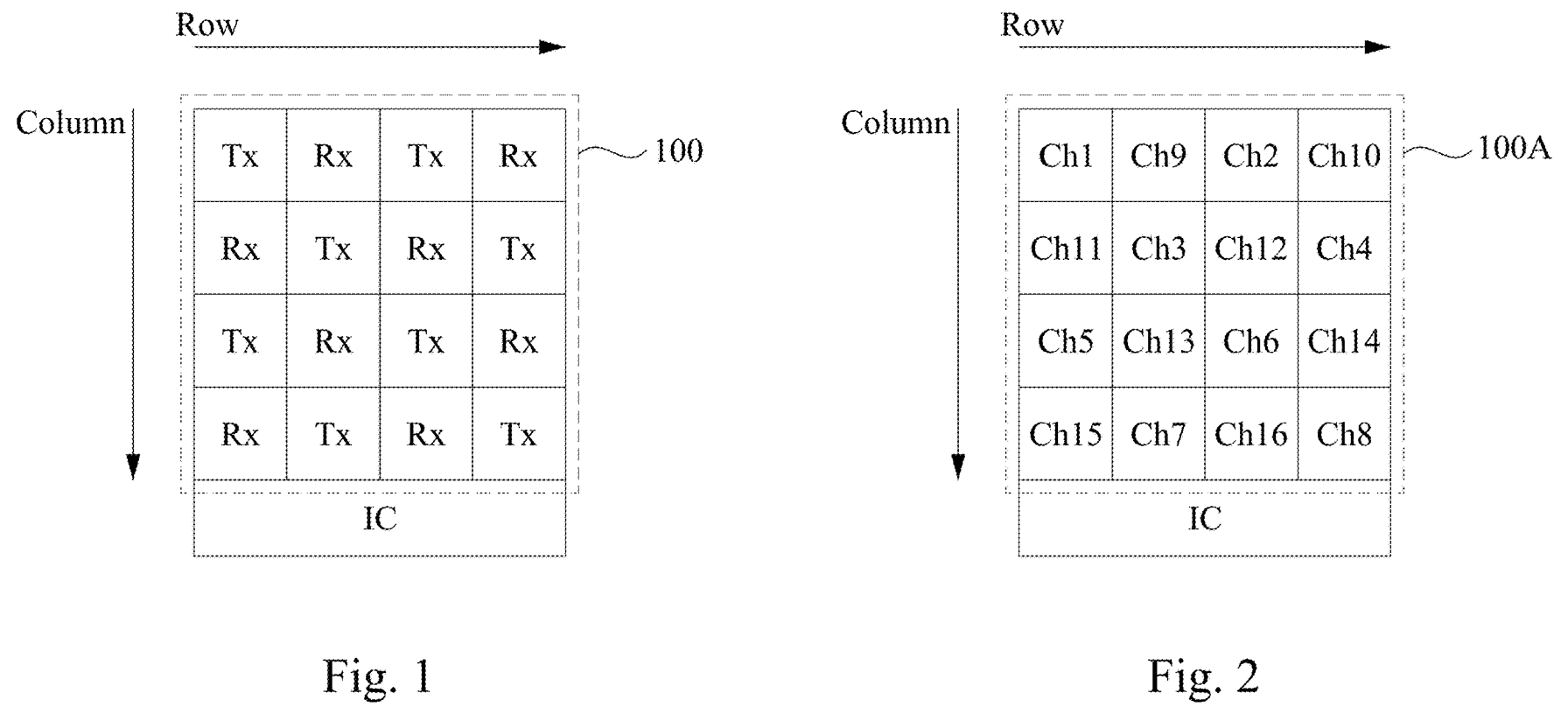

FIG. 1 is a schematic diagram of a sensing circuit according to one embodiment of the present disclosure. As shown in the figure, the sensing circuit 100 includes a plurality of first transceiver capacitors Tx and a plurality of second transceiver capacitors Rx. In connection relationship, the plurality of first transceiver capacitors Tx and the plurality of second transceiver capacitors Rx are alternately arranged to form an array, the plurality of first transceiver capacitors Tx are not adjacent to each other on any row and any column of the array, and the plurality of first transceiver capacitors Tx are adjacent to each other on any diagonal, any subdiagonal, and any superdiagonal of the array. The plurality of second transceiver capacitors Rx are not adjacent to each other on the any line and the any column of the array, and the plurality of second transceiver capacitors Rx are adjacent to each other on the any diagonal, the any subdiagonal, and the any superdiagonal of the array.

For discriminating between the finger and the noise, the present disclosure provides the sensing circuit 100 as shown in FIG. 1, and the detailed description of its related operations is as shown below.

Figure 4:
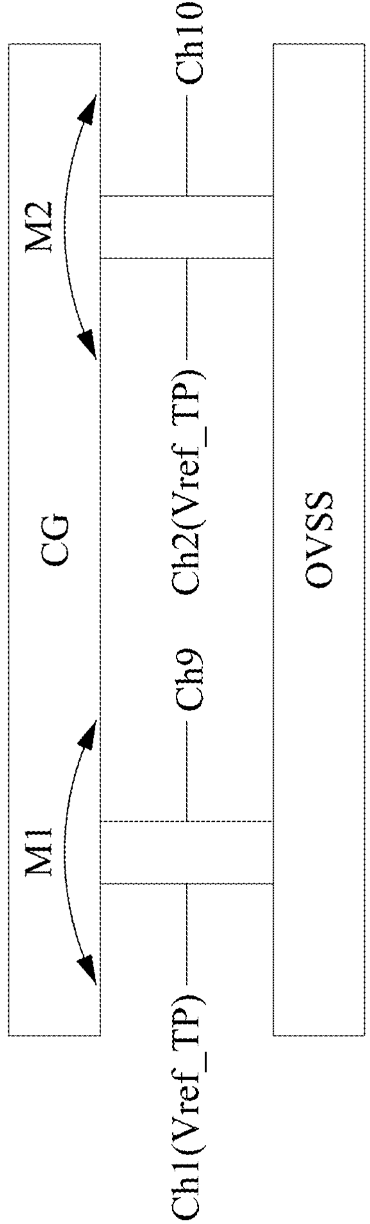
FIG. 4 is a schematic diagram of an operation situation of a sensing circuit according to one embodiment of the present disclosure.

In order to make the above operations of the sensing circuit 100 easy to understand, please refer to FIG. 1 to FIG. 4 together. FIG. 2 is a schematic diagram of a sensing circuit according to one embodiment of the present disclosure. FIG. 3 is a schematic diagram of an operation situation of a sensing circuit according to one embodiment of the present disclosure. FIG. 4 is a schematic diagram of an operation situation of a sensing circuit according to one embodiment of the present disclosure.

Please refer to FIG. 1 to FIG. 4, in one embodiment, the plurality of first transceiver capacitors Tx are configured to send and receive a plurality of first detection signals, and the plurality of first detection signals are independent of each other. Then, the plurality of second transceiver capacitors Rx are configured to send and receive a plurality of second detection signals, and the plurality of second detection signals are independent of each other. For example, the plurality of first transceiver capacitors Tx can be channels Ch1~Ch8 (as shown in FIG. 2), and the plurality of second transceiver capacitors Rx can be channels Ch9~Ch16 (as shown in FIG. 2), but the present disclosure is not limited to this.

Subsequently, during a self-capacitance mode, the plurality of first transceiver capacitors Tx are configured to output the plurality of first detection signals and receive the plurality of first detection signals, and the plurality of second transceiver capacitors Rx are configured to output the plurality of second detection signals and receive the plurality of second detection signals. Please refer to FIG. 3, for example, the plurality of first transceiver capacitors Tx can be a channel Ch1, the plurality of first detection signals can be a first detection signal S1, and the channel Ch1 is configured to output the first detection signal S1 and receive the first detection signal S1. The plurality of second transceiver capacitors Rx can be the channel Ch9, the plurality of second detection signals can be a second detection signal S2, and the channel Ch9 is configured to output the second detection signal S2 and receive the second detection signal S2, but the present disclosure is not limited to this.

Then, during a mutual-capacitance mode, the plurality of first transceiver capacitors Tx are configured to output the plurality of first detection signals, and the plurality of second transceiver capacitors Rx are configured to receive the plurality of first detection signals. Please refer to FIG. 4, for example, the plurality of first detection signals can be a first detection signals M1, the plurality of first transceiver capacitors Tx can be the channel Ch1, and the plurality of second transceiver capacitors Rx can be the channel Ch9. The channel Ch1 is configured to output the first detection signals M1, and the channel Ch9 is configured to receive the first detection signals M1, but the present disclosure is not limited to this.

Figure 5:
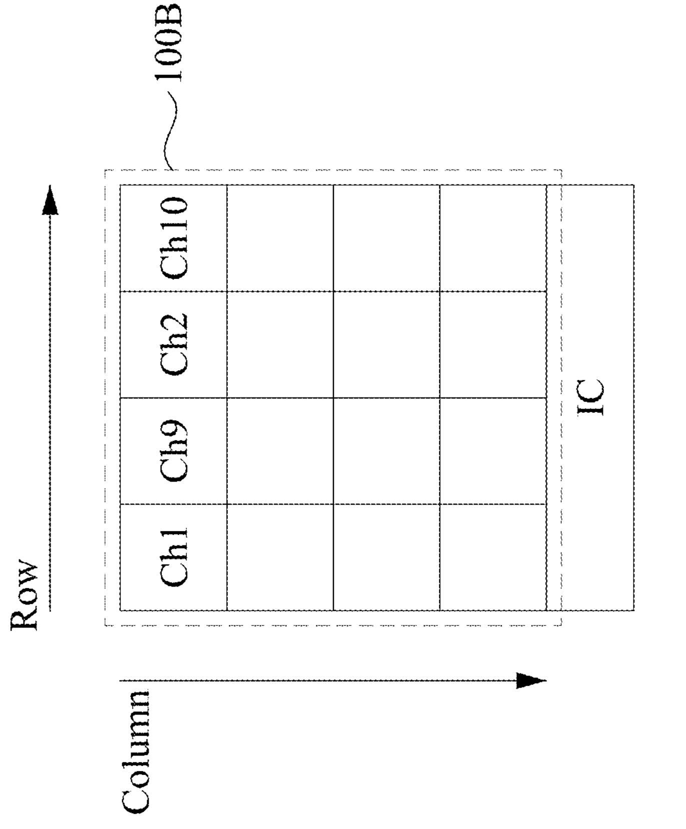
FIG. 5 is a schematic diagram of a sensing circuit according to one embodiment of the present disclosure.

FIG. 5 is a schematic diagram of a sensing circuit according to one embodiment of the present disclosure. Please refer to FIG. 1 and FIG. 5, in one embodiment, each of the plurality of first transceiver capacitors Tx includes a first capacitor (such as the channel Ch1), and each of the plurality of second transceiver capacitors Rx includes a second capacitor (such as the channel Ch9).

In one embodiment, the first capacitor (such as the channel Ch1) is coupled to the second capacitor (such as the channel Ch9) in a first row of the array.

Please refer to FIG. 3 and FIG. 5, in one embodiment, during the self-capacitance mode, the first capacitor (such as the channel Ch1) is configured to output a first self-capacitance sensing signal S1 and receive the first self-capacitance sensing signal S1, and the second capacitor (such as the channel Ch9) is configured to output a second self-capacitance sensing signal S2 and receive the second self-capacitance sensing signal S2.

Please refer to FIG. 4 and FIG. 5, in one embodiment, during the mutual-capacitance mode, the first capacitor (such as the channel Ch1) is configured to output a first mutual-capacitance sensing signal M1, and the second capacitor (such as the channel Ch9) is configured to receive the first mutual-capacitance sensing signal M1.

Please refer to FIG. 5, in one embodiment, each of the plurality of first transceiver capacitors Tx includes a third capacitor (such as channel Ch2), and each of the plurality of second transceiver capacitors Rx includes a fourth capacitor (such as the channel Ch10).

In one embodiment, the third capacitor (such as channel Ch2) is coupled to the second capacitor (such as the channel Ch9) in the first row of the array.

In one embodiment, the fourth capacitor (such as the channel Ch10) is coupled to the third capacitor (such as channel Ch2) in the first row of the array.

Please refer to FIG. 3 and FIG. 5, in one embodiment, during the self-capacitance mode, the third capacitor (such as channel Ch2) is configured to output a third self-capacitance sensing signal S3 and receive the third self-capacitance sensing signal S3, and the fourth capacitor (such as the channel Ch10) is configured to output a fourth self-capacitance sensing signal S4 and receive the fourth self-capacitance sensing signal S4.

Please refer to FIG. 4 and FIG. 5, in one embodiment, during the mutual-capacitance mode, the third capacitor (such as channel Ch2) is configured to output a second mutual-capacitance sensing signal M2, and the fourth capacitor (such as the channel Ch10) is configured to receive the second mutual-capacitance sensing signal M2.

Figure 6:
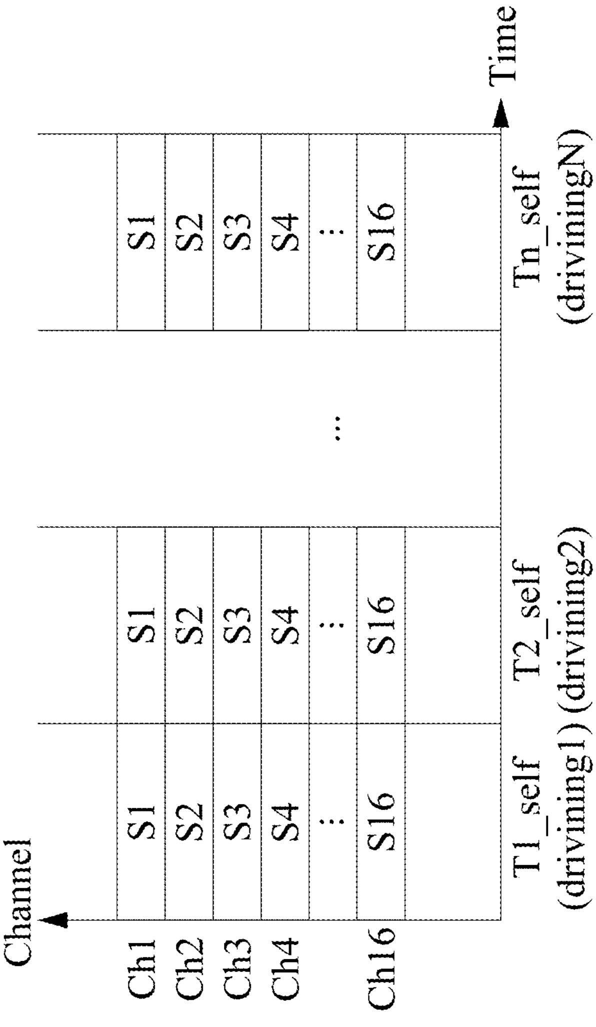
FIG. 6 is a schematic diagram of receiving a plurality of signals at a plurality of periods according to one embodiment of the present disclosure.

FIG. 6 is a schematic diagram of receiving a plurality of signals at a plurality of periods according to one embodiment of the present disclosure. Please refer to FIG. 3, FIG. 5, and FIG. 6 together, in one embodiment, during a first self-capacitance operation period (such as T1_self) of the self-capacitance mode, the first capacitor (such as the channel Ch1) is configured to output the first self-capacitance sensing signal S1 and simultaneously receive the first self-capacitance sensing signal S1. Then, the second capacitor (such as the channel Ch9) is configured to output the second self-capacitance sensing signal S2 and simultaneously receive the second self-capacitance sensing signal S2.

Subsequently, the third capacitor (such as channel Ch2) is configured to output the third self-capacitance sensing signal S3 and simultaneously receive the third self-capacitance sensing signal S3. Then, the fourth capacitor (such as the channel Ch10) is configured to output the fourth self-capacitance sensing signal and simultaneously receive the fourth self-capacitance sensing signal. For example, in the first self-capacitance operation period (such as T1_self) can be regarded as simultaneous, but the present disclosure is not limited to this.

Figure 7:
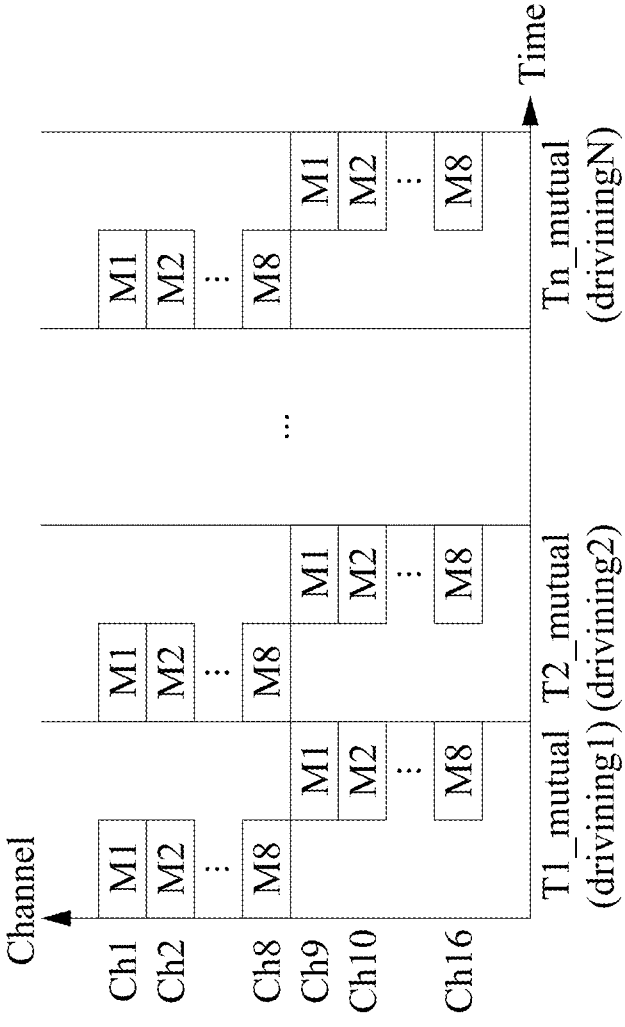
FIG. 7 is a schematic diagram of receiving a plurality of signals at a plurality of periods according to one embodiment of the present disclosure.

FIG. 7 is a schematic diagram of receiving a plurality of signals at a plurality of periods according to one embodiment of the present disclosure. Please refer to FIG. 4, FIG. 5, and FIG. 7 together, in one embodiment, during a first mutual-capacitance operation period (such as T1_mutual) of the mutual-capacitance mode, the first capacitor (such as the channel Ch1) is configured to output the first mutual-capacitance sensing signal M1. Then, the second capacitor (such as the channel Ch9) is configured to simultaneously receive the first mutual-capacitance sensing signal M1.

Subsequently, the third capacitor (such as channel Ch2) is configured to simultaneously output the second mutual-capacitance sensing signal M2. Then, the fourth capacitor (such as the channel Ch10) is configured to simultaneously receive the second mutual-capacitance sensing signal M2. For example, in the first mutual-capacitance operation period (such as T1_mutual) can be regarded as simultaneous, but the present disclosure is not limited to this.

Figure 8:
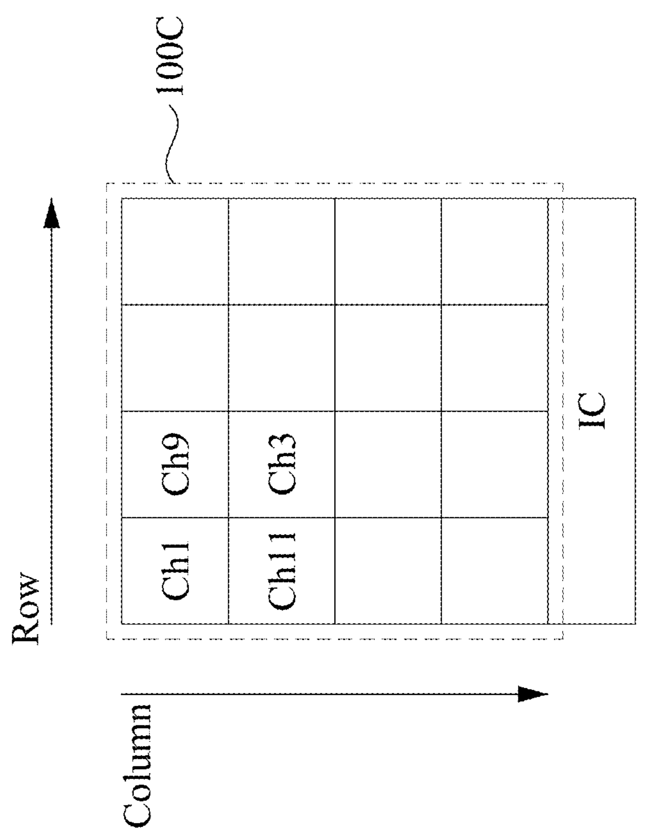
FIG. 8 is a schematic diagram of a sensing circuit according to one embodiment of the present disclosure.

FIG. 8 is a schematic diagram of a sensing circuit according to one embodiment of the present disclosure. Please refer to FIG. 1 and FIG. 8, in one embodiment, each of the plurality of first transceiver capacitors Tx includes a third capacitor (such as the channel Ch3), and each of the plurality of second transceiver capacitors Rx includes a fourth capacitor (such as the channel Ch11).

In one embodiment, the first capacitor (such as the channel Ch1) is coupled to the second capacitor (such as the channel Ch9) in the first row of the array.

In one embodiment, the fourth capacitor (such as the channel Ch11) is coupled to the first capacitor (such as the channel Ch1) in a first column of the array.

In one embodiment, the third capacitor (such as the channel Ch3) is coupled to the fourth capacitor (such as the channel Ch11) in a second row of the array, and the third capacitor (such as the channel Ch3) is coupled to the second capacitor (such as the channel Ch9). In some embodiments, the third capacitor (such as the channel Ch3) is coupled to the second capacitor (such as the channel Ch9) in a second column.

Figure 9:
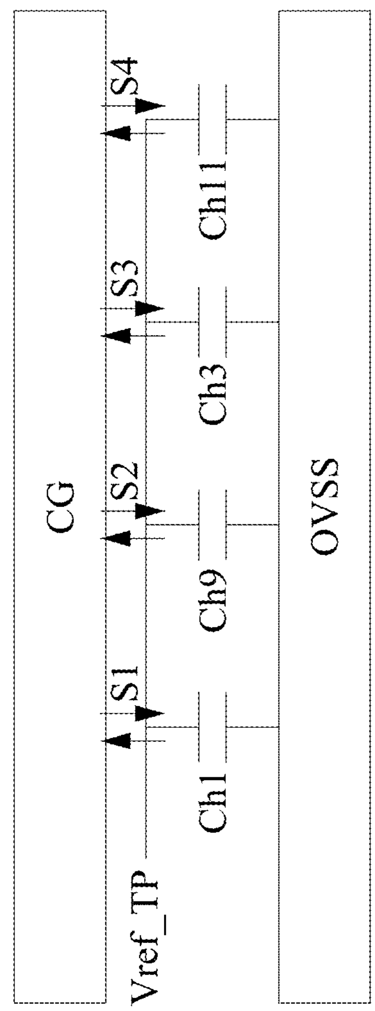
FIG. 9 is a schematic diagram of an operation situation of a sensing circuit according to one embodiment of the present disclosure.

FIG. 9 is a schematic diagram of an operation situation of a sensing circuit according to one embodiment of the present disclosure. Please refer to FIG. 8 and FIG. 9 together, in one embodiment, during the self-capacitance mode, the third capacitor (such as the channel Ch3) is configured to output a third self-capacitance sensing signal S3 and receive the third self-capacitance sensing signal S3, and the fourth capacitor (such as the channel Ch11) is configured to output a fourth self-capacitance sensing signal S4 and receive the fourth self-capacitance sensing signal S4.

Figure 10:
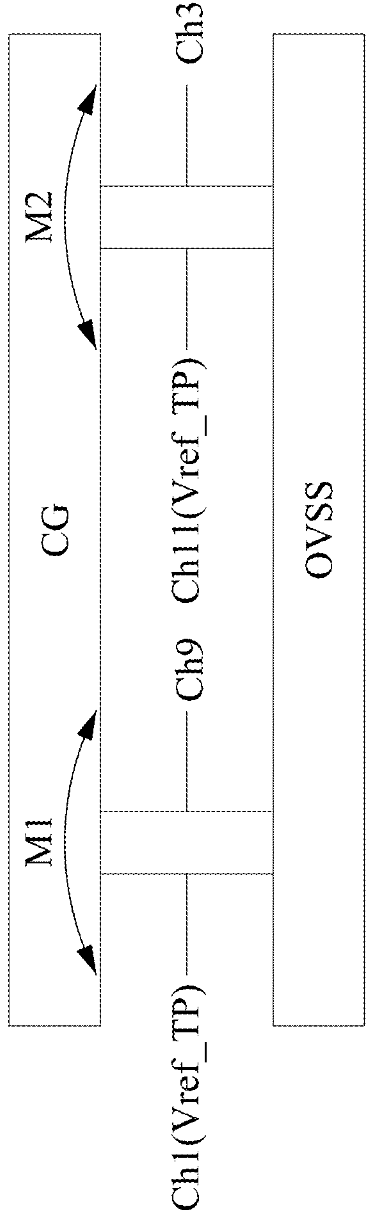
FIG. 10 is a schematic diagram of an operation situation of a sensing circuit according to one embodiment of the present disclosure.

FIG. 10 is a schematic diagram of an operation situation of a sensing circuit according to one embodiment of the present disclosure. Please refer to FIG. 8 and FIG. 10 together, in one embodiment, during the mutual-capacitance mode, the third capacitor (such as the channel Ch3) is configured to output a second mutual-capacitance sensing signal M2, and the fourth capacitor (such as the channel Ch11) is configured to receive the second mutual-capacitance sensing signal M2.

Please refer to FIG. 6, FIG. 8, and FIG. 9 together, in one embodiment, during a first self-capacitance operation period (such as T1_self) of the self-capacitance mode, the first capacitor (such as the channel Ch1) is configured to output the first self-capacitance sensing signal S1 and simultaneously receive the first self-capacitance sensing signal S1, the second capacitor (such as the channel Ch9) is configured to output the second self-capacitance sensing signal S2 and simultaneously receive the second self-capacitance sensing signal S2, the third capacitor (such as the channel Ch3) is configured to output the third self-capacitance sensing signal S3 and simultaneously receive the third self-capacitance sensing signal S3, and the fourth capacitor (such as the channel Ch11) is configured to output the fourth self-capacitance sensing signal S4 and simultaneously receive the fourth self-capacitance sensing signal S4. For example, in the first self-capacitance operation period (such as T1_self) can be regarded as simultaneous, but the present disclosure is not limited to this.

Please refer to FIG. 6, FIG. 8, and FIG. 10 together, in one embodiment, during a first mutual-capacitance operation period (such as T1_mutual) of the mutual-capacitance mode, the first capacitor (such as the channel Ch1) is configured to output the first mutual-capacitance sensing signal M1, the second capacitor (such as the channel Ch9) is configured to simultaneously receive the first mutual-capacitance sensing signal M1, the third capacitor (such as the channel Ch3) is configured to simultaneously output the second mutual-capacitance sensing signal M2, and the fourth capacitor (such as the channel Ch11) is configured to simultaneously receive the second mutual-capacitance sensing signal M2. For example, in the first mutual-capacitance operation period (such as T1_mutual) can be regarded as simultaneous, but the present disclosure is not limited to this.

Please refer to FIG. 2 and FIG. 6, in one embodiment, the self-capacitance mode includes n self-capacitance operation periods (such as T1_self to Tn_self), and n is an integer greater than zero.

Please refer to FIG. 2 and FIG. 7, in one embodiment, the mutual-capacitance mode includes n mutual-capacitance operation periods (such as T1_mutual to Tn_mutual), and n is an integer greater than zero.

Figure 11:
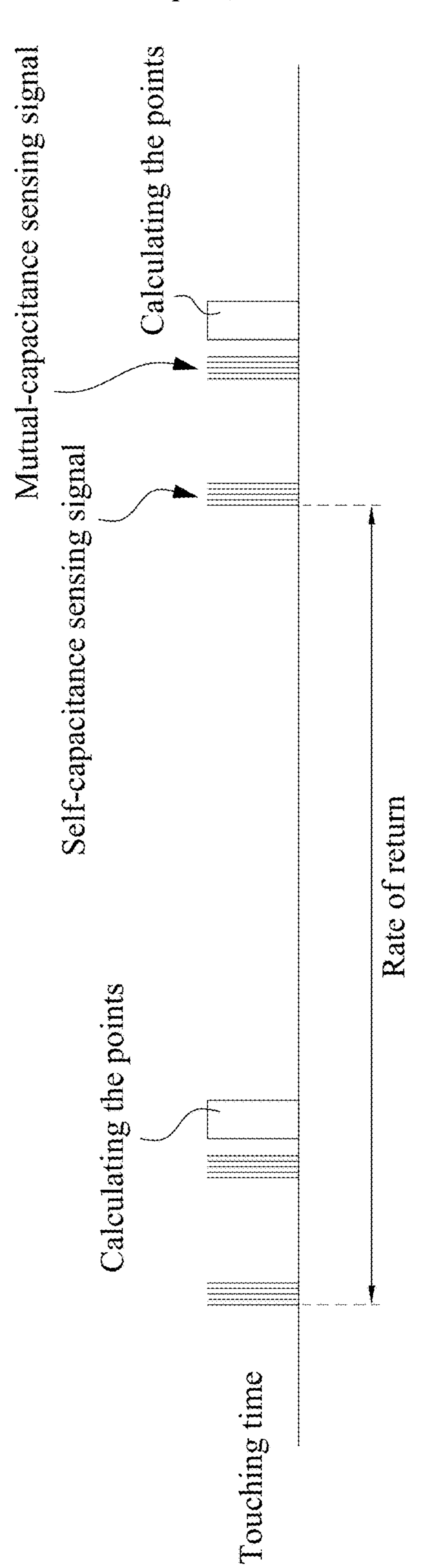
FIG. 11 is a schematic diagram of an operation situation of a sensing circuit according to one embodiment of the present disclosure.

FIG. 11 is a schematic diagram of an operation situation of a sensing circuit according to one embodiment of the present disclosure. As shown in the figure, in one embodiment, the sensing circuit includes a detector. During a touching time, the detector receives a plurality of self-capacitance sensing signals and a plurality of mutual-capacitance sensing signals at the same time, and then calculates the points. For example, "calculating the points" can be the detector receive the plurality of self-capacitance sensing signals signals and the plurality of mutual-capacitance sensing signals at the same time, and then calculates the coordinate (such as xy coordinate) position of the touch signal, but the present disclosure is not limited to this.

Please refer to FIG. 2, and FIG. 9 to FIG. 11 together, in one embodiment, during the self-capacitance mode and the mutual-capacitance mode, both the plurality of self-capacitance sensing signals and the plurality of mutual-capacitance sensing signals are received, and it can be determined that the touch signal is a signal which is triggered by the finger.

In one embodiment, during the self-capacitance mode and the mutual-capacitance mode, if only the plurality of self-capacitance sensing signals are received, it can be determined that the touch signal is the noise or the air gap between the panels changes, resulting in a deformation-triggered signal. For example, when it is judged that the touch signal is the noise or when it is judged that the change in the air gap between the panels, a deformation-triggered signal is therefore generated, the noise or deformation-triggered signal can be calibrated or drop frame. In addition, the noise can come from the common electrode DC voltage OVSS, but the present disclosure is not limited to this.

Figure 12:
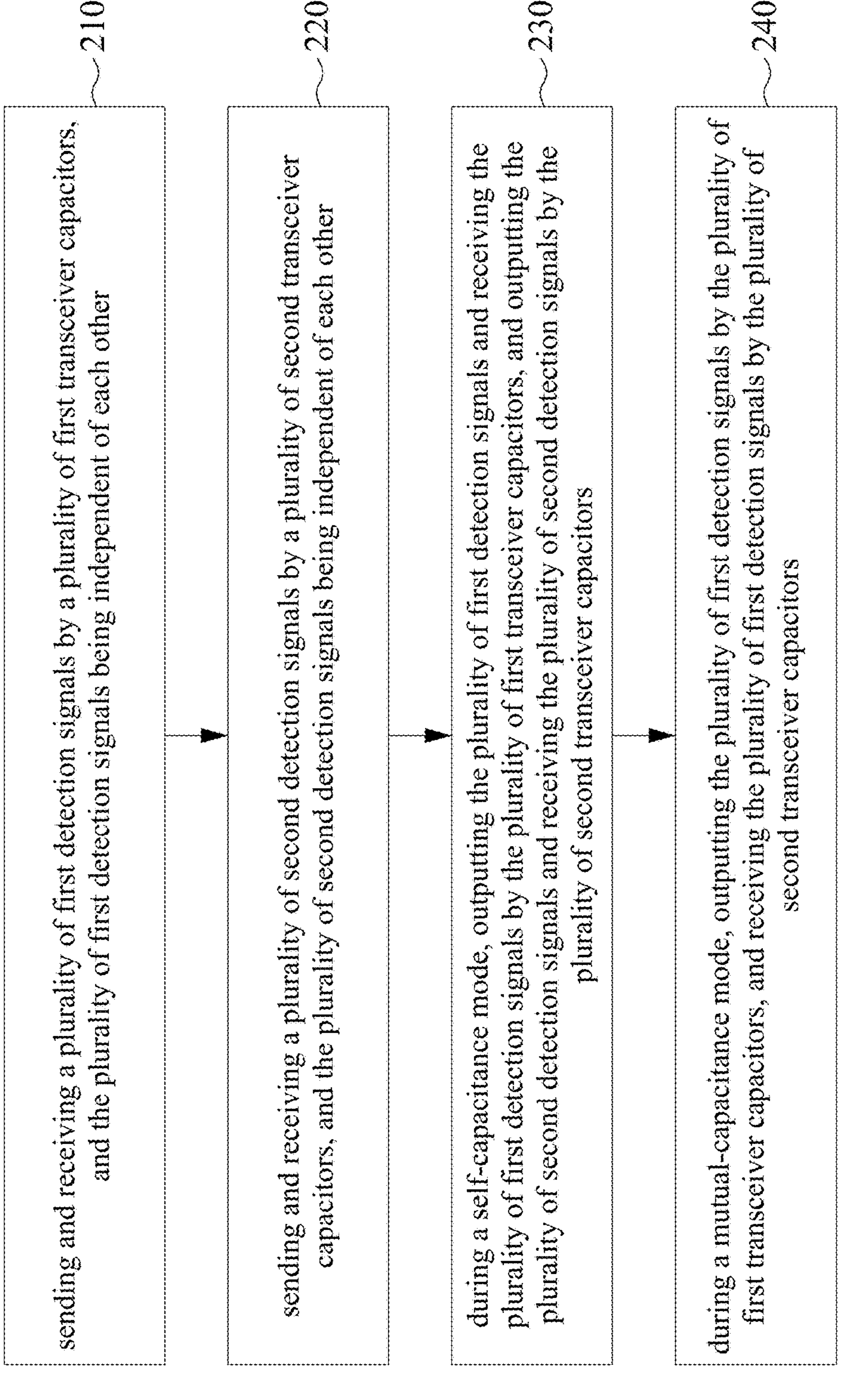
FIG. 12 is a flowchart of an sensing method according to one embodiment of the present disclosure.

FIG. 12 is a flowchart of an sensing method according to one embodiment of the present disclosure. In order to make the sensing method 200 of FIG. 12 easier to understand, please refer to FIG. 1 to FIG. 4, and FIG. 12 together. The sensing method 200 of FIG. 12 includes the following steps:

Step 210: sending and receiving a plurality of first detection signals by a plurality of first transceiver capacitors Tx, and the plurality of first detection signals being independent of each other;

Step 220: sending and receiving a plurality of second detection signals by a plurality of second transceiver capacitors Rx, and the plurality of second detection signals being independent of each other;

Step 230: during a self-capacitance mode, outputting the plurality of first detection signals and receiving the plurality of first detection signals by the plurality of first transceiver capacitors Tx, and outputting the plurality of second detection signals and receiving the plurality of second detection signals by the plurality of second transceiver capacitors Rx;

Step 240: during a mutual-capacitance mode, outputting the plurality of first detection signals by the plurality of first transceiver capacitors Tx, and receiving the plurality of first detection signals by the plurality of second transceiver capacitors Rx.

In one embodiment, please refer to step 210, sending and receiving a plurality of first detection signals by a plurality of first transceiver capacitors Tx, and the plurality of first detection signals being independent of each other. For example, the plurality of first transceiver capacitors Tx can be channels Ch1~Ch8 (as shown in FIG. 2), but the present disclosure is not limited to this.

In one embodiment, please refer to step 220, sending and receiving a plurality of second detection signals by a plurality of second transceiver capacitors Rx, and the plurality of second detection signals being independent of each other. For example, the plurality of second transceiver capacitors Rx can be channels Ch9~Ch16 (as shown in FIG. 2), but the present disclosure is not limited to this.

In one embodiment, please refer to step 230 and FIG. 3, during a self-capacitance mode, outputting the plurality of first detection signals and receiving the plurality of first detection signals by the plurality of first transceiver capacitors Tx, and outputting the plurality of second detection signals and receiving the plurality of second detection signals by the plurality of second transceiver capacitors Rx. For example, the plurality of first transceiver capacitors Tx can be a channel Ch1, the plurality of first detection signals can be a first detection signal S1, the channel Ch1 is configured to output the first detection signal S1 and receive the first detection signal S1, the plurality of second transceiver capacitors Rx can be the channel Ch9, the plurality of second detection signals can be a second detection signal S2, the channel Ch9 is configured to output the second detection signal S2 and receive the second detection signal S2, but the present disclosure is not limited to this.

In one embodiment, please refer to step 240 and FIG. 4, during a mutual-capacitance mode, outputting the plurality of first detection signals by the plurality of first transceiver capacitors Tx, and receiving the plurality of first detection signals by the plurality of second transceiver capacitors Rx. For example, the plurality of first detection signals can be a first detection signals M1, the plurality of first transceiver capacitors Tx can be the channel Ch1, the plurality of second transceiver capacitors Rx can be the channel Ch9, the channel Ch1 is configured to output the first detection signals M1, the channel Ch9 is configured to receive the first detection signals M1, but the present disclosure is not limited to this.

It can be seen from the above implementation of the present disclosure that the application of the present disclosure has the following advantages. The sensing circuit and sensing method shown in the embodiment of the present disclosure can discriminate between the finger and the noise, so as to achieve the effect of normal touch function.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A sensing circuit, comprising:

a plurality of first transceiver channels, configured to send and receive a plurality of first detection signals, and the plurality of first detection signals are independent of each other; and a plurality of second transceiver channels, configured to send and receive a plurality of second detection signals, and the plurality of second detection signals are independent of each other, wherein the plurality of first transceiver channels and the plurality of second transceiver channels are alternately arranged to form an array, wherein during a self-capacitance mode, each of the plurality of first transceiver channels and the plurality of second transceiver channels are configured to output and receive a corresponding one of a plurality of self-capacitance sensing signals, wherein during a mutual-capacitance mode, the plurality of first transceiver channels are configured to output a plurality of mutual-capacitance sensing signals, and the plurality of second transceiver channels are configured to receive the plurality of mutual-capacitance sensing signals, wherein the first transceiver channels and the second transceiver channels output and receive the corresponding one of the plurality of self-capacitance sensing signals during the self-capacitance mode and the first transceiver channels and the second transceiver channels respectively output and receive the mutual-capacitance sensing signals in the mutual-capacitance mode, a touch signal is determined as a signal triggered by a finger if both the plurality of self-capacitance sensing signals and the plurality of mutual-capacitance sensing signals are received from the array, and the touch signal is determined as a noise or a deformation-triggered signal representing a change of an air gap between panels if only the plurality of self-capacitance sensing signals are received from the array; and wherein the touch signal is calibrated or drop frame when the touch signal is determined as the noise signal or the deformation-triggered signal.

2. The sensing circuit of claim 1, wherein each of the plurality of first transceiver channels comprises a first channel, wherein each of the plurality of second transceiver channels comprises a second channel.

3. The sensing circuit of claim 2, wherein the first channel is coupled to the second channel in a first row of the array.

4. The sensing circuit of claim 3, wherein during the self-capacitance mode, the first channel is configured to output a first self-capacitance sensing signal and receive the first self-capacitance sensing signal, and the second channel is configured to output a second self-capacitance sensing signal and receive the second self-capacitance sensing signal.

5. The sensing circuit of claim 4, wherein during the mutual-capacitance mode, the first channel is configured to output a first mutual-capacitance sensing signal, and the second channel is configured to receive the first mutual-capacitance sensing signal.

6. The sensing circuit of claim 4, wherein each of the plurality of first transceiver channels further comprises a third channel, wherein each of the plurality of second transceiver channels further comprises a fourth channel.

7. The sensing circuit of claim 6, wherein the third channel is coupled to the second channel in the first row of the array, wherein the fourth channel is coupled to the third channel in the first row of the array.

8. The sensing circuit of claim 7, wherein during the self-capacitance mode, the third channel is configured to output a third self-capacitance sensing signal and receive the third self-capacitance sensing signal, and the fourth channel is configured to output a fourth self-capacitance sensing signal and receive the fourth self-capacitance sensing signal.

9. The sensing circuit of claim 8, wherein during the mutual-capacitance mode, the third channel is configured to output a second mutual-capacitance sensing signal, and the fourth channel is configured to receive the second mutual-capacitance sensing signal.

10. The sensing circuit of claim 9, wherein during a first self-capacitance operation period of the self-capacitance mode, the first channel is configured to output the first self-capacitance sensing signal and simultaneously receive the first self-capacitance sensing signal, the second channel is configured to output the second self-capacitance sensing signal and simultaneously receive the second self-capacitance sensing signal, the third channel is configured to output the third self-capacitance sensing signal and simultaneously receive the third self-capacitance sensing signal, and the fourth channel is configured to output the fourth self-capacitance sensing signal and simultaneously receive the fourth self-capacitance sensing signal.

11. The sensing circuit of claim 10, wherein during a first mutual-capacitance operation period of the mutual-capacitance mode, the first channel is configured to output a first mutual-capacitance sensing signal, the second channel is configured to simultaneously receive the first mutual-capacitance sensing signal, the third channel is configured to simultaneously output the second mutual-capacitance sensing signal, and the fourth channel is configured to simultaneously receive the second mutual-capacitance sensing signal.

12. The sensing circuit of claim 2, wherein the first channel is coupled to the second channel in a first row of the array, wherein each of the plurality of first transceiver channels further comprises a third channel, wherein each of the plurality of second transceiver channels further comprises a fourth channel.

13. The sensing circuit of claim 12, wherein the fourth channel is coupled to the first channel in a first column of the array.

14. The sensing circuit of claim 13, wherein the third channel is coupled to the fourth channel in a second row of the array, and the third channel is coupled to the second channel.

15. The sensing circuit of claim 14, wherein during the self-capacitance mode, the third channel is configured to output a third self-capacitance sensing signal and receive the third self-capacitance sensing signal, and the fourth channel is configured to output a fourth self-capacitance sensing signal and receive the fourth self-capacitance sensing signal.

16. The sensing circuit of claim 15, wherein during the mutual-capacitance mode, the third channel is configured to output a second mutual-capacitance sensing signal, and the fourth channel is configured to receive the second mutual-capacitance sensing signal.

17. The sensing circuit of claim 16, wherein during a first self-capacitance operation period of the self-capacitance mode, the first channel is configured to output a first self-capacitance sensing signal and simultaneously receive the first self-capacitance sensing signal, the second channel is configured to output a second self-capacitance sensing signal and simultaneously receive the second self-capacitance sensing signal, the third channel is configured to output the third self-capacitance sensing signal and simultaneously receive the third self-capacitance sensing signal, and the fourth channel is configured to output the fourth self-capacitance sensing signal and simultaneously receive the fourth self-capacitance sensing signal.

18. The sensing circuit of claim 17, wherein during a first mutual-capacitance operation period of the mutual-capacitance mode, the first channel is configured to output a first mutual-capacitance sensing signal, the second channel is configured to simultaneously receive the first mutual-capacitance sensing signal, the third channel is configured to simultaneously output the second mutual-capacitance sensing signal, and the fourth channel is configured to simultaneously receive the second mutual-capacitance sensing signal.

19. A sensing method, comprising:

sending and receiving a plurality of first detection signals by a plurality of first transceiver channels, and the plurality of first detection signals being independent of each other;

sending and receiving a plurality of second detection signals by a plurality of second transceiver channels, and the plurality of second detection signals being independent of each other, wherein the plurality of first transceiver channels and the plurality of second transceiver channels are alternately arranged to form an array;

during a self-capacitance mode, outputting and receiving a corresponding one of a plurality of self-capacitance sensing signals by each of the plurality of first transceiver channels and the plurality of second transceiver channels;

during a mutual-capacitance mode, outputting a plurality of mutual-capacitance sensing signals by the plurality of first transceiver channels, and receiving the plurality of mutual-capacitance sensing signals by the plurality of second transceiver channels;

outputting and receiving the corresponding one of the plurality of self-capacitance sensing signals by using the first transceiver channels and the second transceiver channels during the self-capacitance mode and the first transceiver channels and the second transceiver channels respectively output and receive the mutual-capacitance sensing signals in the mutual-capacitance mode, determining a touch signal as a signal triggered by a finger if both the plurality of self-capacitance sensing signals and the plurality of mutual-capacitance sensing signals are received from the array, and determining the touch signal as a deformation-triggered signal representing a change of an air gap between panels if only the plurality of self-capacitance sensing signals are received from the array; and performing a calibrating operation or a drop frame operation on the touch signal when the touch signal is determined as the deformation-triggered signal.

* * * * *